(12) United States Patent
Im et al.

(10) Patent No.: US 9,262,079 B2
(45) Date of Patent: Feb. 16, 2016

(54) CACHE MEMORY DEVICE AND DATA PROCESSING METHOD OF THE DEVICE

(71) Applicant: SAMSUNG ELECTRONICS CO., LTD., Suwon-si, Gyeonggi-do (KR)

(72) Inventors: Kwang Seok Im, Seoul (KR); Hye Young Kim, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/561,470

(22) Filed: Dec. 5, 2014

(65) Prior Publication Data

US 2015/0081962 A1 Mar. 19, 2015

Related U.S. Application Data

(63) Continuation of application No. 12/146,950, filed on Jun. 26, 2008.

(30) Foreign Application Priority Data

Jul. 13, 2007 (KR) ........................ 10-2007-0070369

(51) Int. Cl.
*G06F 3/06* (2006.01)
*G06F 12/08* (2006.01)

(52) U.S. Cl.
CPC .............. *G06F 3/061* (2013.01); *G06F 3/0656* (2013.01); *G06F 3/0688* (2013.01); *G06F 12/0895* (2013.01); *G06F 2003/0691* (2013.01); *G06F 2212/2022* (2013.01)

(58) Field of Classification Search
CPC ... G06F 12/0895; G06F 3/061; G06F 3/0656; G06F 3/0688; G06F 2003/0691; G06F 2212/2022
USPC ......................................... 711/141
See application file for complete search history.

(56) References Cited

U.S. PATENT DOCUMENTS 5,574,944 A * 11/1996 Stager ................. G06F 13/4217
710/5
5,651,136 A * 7/1997 Denton et al. ................ 711/118
(Continued)

FOREIGN PATENT DOCUMENTS

| JP | 11-272551 | 10/1999 |
| JP | 2003-196989 | 7/2003 |

(Continued)

OTHER PUBLICATIONS

CompactFlash Association, "CF+ and CompactFlash Specification Revision 4.0" May 24, 2006.

*Primary Examiner* — Matthew Bradley
*Assistant Examiner* — Ramon A Mercado
(74) *Attorney, Agent, or Firm* — F. Chau & Associates, LLC

(57) ABSTRACT

A cache memory device is provided. The cache memory device includes a memory including a first cache memory region and a second cache memory region, and a control block. The control block determines a type of data to be received. The control block also performs at least one of transmitting a head of received data to a first cache memory region, transmitting a body of the received data to a second cache memory region and transmitting a tail of the received data to the first cache memory region based on the type of the data to be received.

20 Claims, 9 Drawing Sheets

(56) References Cited

U.S. PATENT DOCUMENTS

| | | | |
|---|---|---|---|
| 6,711,635 B1 * | 3/2004 | Wang | G06F 3/0613 710/52 |
| 7,408,834 B2 * | 8/2008 | Conley et al. | 365/230.08 |
| 2005/0152188 A1 | 7/2005 | Ju | |
| 2013/0073784 A1 * | 3/2013 | Ng et al. | 711/103 |

FOREIGN PATENT DOCUMENTS

| KR | 1020060089108 | 8/2006 |
|---|---|---|
| KR | 1020070036652 | 4/2007 |

* cited by examiner

FIG. 3

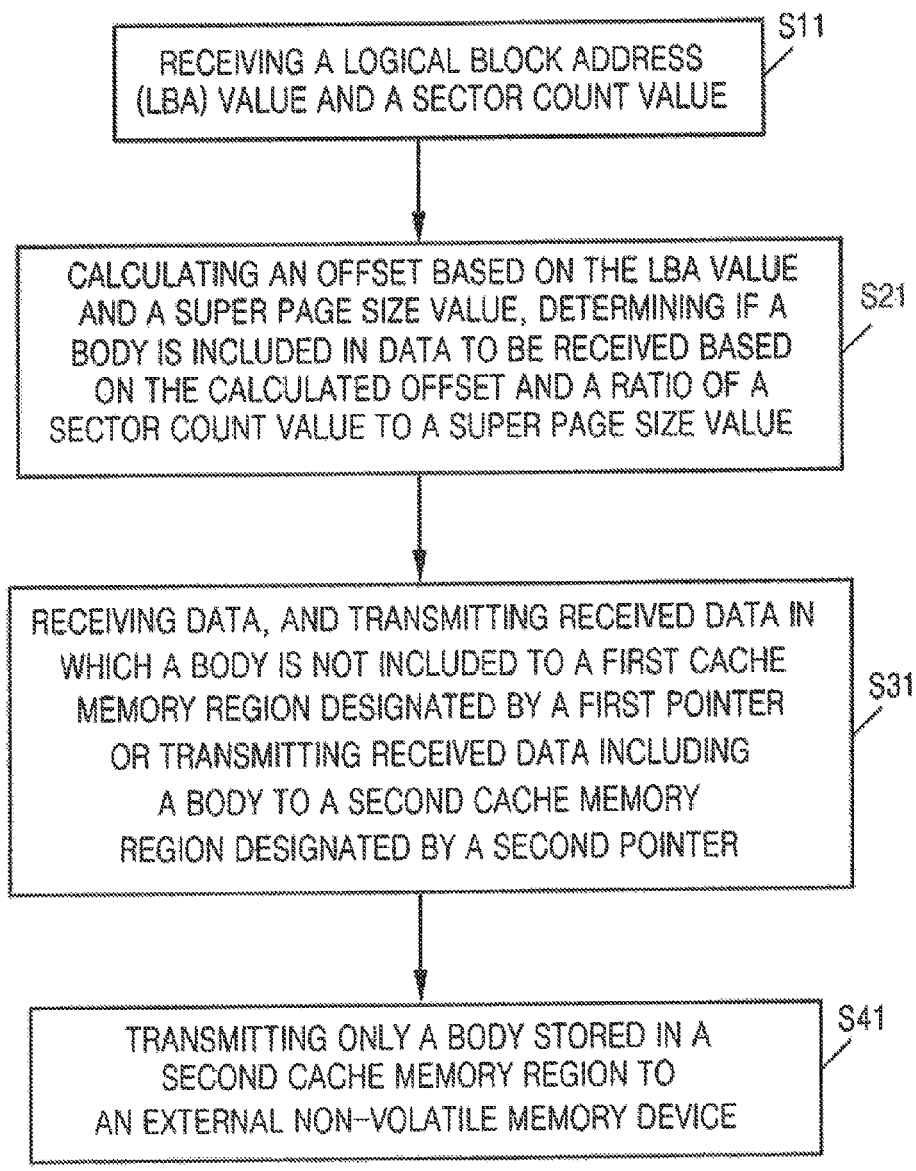

US 9,262,079 B2

CACHE MEMORY DEVICE AND DATA PROCESSING METHOD OF THE DEVICE

CROSS-REFERENCE TO RELATED APPLICATIONS

This application is a continuation application of co-pending U.S. application Ser. No. 12/146,950 filed Jun. 26, 2008, which claims priority under 35 U.S.C. §119 to Korean Patent Application No. 10-2007-0070369, filed on Jul. 13, 2007, the disclosures of which are each incorporated by reference in their entireties.

BACKGROUND OF THE INVENTION

1. Technical Field

The present disclosure relates to a semiconductor device, and more particularly, to a cache memory device capable of improving the performance of writing/reading data between a host and a non-volatile memory device, and a data processing method of the cache memory device.

2. Discussion of Related Art

Data transmission speed of a host in a system including a Serial Advanced Technology Attachment (SATA) oriented Solid State Disk (SSD) may be higher than in systems that make use of other memory devices, such as a NAND type Electrically Erasable and Programmable Read Only Memory (EEPROM) based non-volatile memory device. Accordingly, a system including the SATA oriented SSD may require a large-capacity buffer for smooth data transmission.

FIG. 1 is a block diagram of a conventional non-volatile memory system that includes a buffer. Referring to FIG. 1 the non-volatile memory system 10 includes a host 20, a buffer 30, and a non-volatile memory device 40.

The buffer 30 in the non-volatile memory system 10 has a large capacity for storing data transmitted from the host 20 to the non-volatile memory device 40, because the data processing speed of the host 20 is much faster than that of the non-volatile memory device 40. The buffer 30 temporarily stores data that is received from the host 20 and data from the non-volatile memory device 40 that is destined for the host 20. The buffer 30 may be embodied as a volatile memory device such as a Synchronous Dynamic Random Access Memory (SDRAM).

The non-volatile memory device 40 receives and stores data output from the buffer 30. The non-volatile memory device 40 includes a memory cell array 41 having non-volatile memory cells such as a NAND type EEPROM, and a page buffer 43. The memory cell array 41 exchanges data with the buffer 30 through the page buffer 43. The non-volatile memory 10 is less efficient because the buffer 30 is only used for buffering data transmitted to the non-volatile memory device 40.

The page buffer 43 reads or writes data in the units of a page. Each page may include n sectors, where n is a natural number and equals 8. For example, when there are four channels between the buffer 30 and the non-volatile memory device 40 and data is transmitted from the buffer 30 to the non-volatile memory device 40 across the channels, pages having 32-sectors (=4*8-sector) may be required for the non-volatile memory system 10 to operate optimally.

However, when the size of data transmitted from the buffer 30 to the non-volatile memory device 40 is less than 32-sectors, the non-volatile memory system 10 becomes less efficient since some of the four channels may not be used.

Thus, there is a need for a cache memory device capable of improving performance of writing/reading data between a host and a non-volatile memory device, a method of operating the cache memory device, and a system that includes the cache memory device.

SUMMARY OF THE INVENTION

An exemplary embodiment of the present invention includes a data processing method of a cache memory device. The method includes: determining a type of data to be received and performing at least one of transmitting a head of received data to a first cache memory area, transmitting a body of the received data to a second cache memory region, and transmitting a tail of the received data to the first cache memory region based on the determined type of data.

The determining includes receiving a logical block address value and a sector count value, calculating an offset based on the received logical block address value and a super page value, and determining the type of the data to be received based on the calculated offset and a ratio of the received sector count value to the super page value.

The performing may include, based on the calculated offset and the determined type of data, performing at least one of transmitting the head or the tail to the first cache memory region designated by a first pointer and transmitting the body to the second cache memory region designated by a second pointer.

The data processing method of the cache memory device may further include transmitting the body stored in the second cache memory region to an external non-volatile memory device through a channel.

The offset may be a remainder obtained by dividing the received logical block address value by the super page value. The super page value may be obtained by multiplying a number of channels between the cache memory device and an external non-volatile memory device by a number of sectors, which may be stored in a page buffer in the external non-volatile memory device.

An exemplary embodiment of the present invention includes a data processing method of a cache memory device. The method includes determining a data type of received data that indicates whether the received data includes a body, and transmitting one of the received data excluding the body to a first cache memory region or transmitting the received data including the body to a second cache memory area based on the determined type of the received data.

The determining of the data type includes receiving a logical block address value and a sector count value, calculating an offset based on the received logical block address value and a super page value, and generating the data type based on the calculated offset and a ratio of the received sector count value to the super page value. The data processing method of the cache memory may further include transmitting the data including the body stored in the second cache memory region to an external non-volatile memory device through a channel.

An exemplary embodiment of the present invention includes a cache memory device. The cache memory device includes a memory including a first cache memory region and a second cache memory region, and a control block. The control block determines the type of data to be received, and performs at least one of transmitting a head of the received data to a first cache memory region, transmitting a body of the received data to a second memory region, and transmitting a tail of the received data to the first cache memory region based on the type of data to be received.

The control block may include an offset calculator, a determination unit, and a controller. The offset calculator calculates an offset based on a logical block address value and a super page value. The determination unit determines the type of the data to be received based on the calculated offset and a ratio of a sector count value to the super page value. The controller, based on the offset calculated by the offset calculator and a determination result output from the determination unit, controls at least one of transmitting the head or the tail to the first cache memory region designated by a first pointer and transmitting the body to the second cache memory region designated by the second pointer.

An exemplary embodiment of the present invention includes a cache memory device. The cache memory device includes a memory including a first cache memory region and a second cache memory region, and a control block. The control block determines whether data to be received includes a body, and transmits the received data excluding the body to a first cache memory region or transmits the received data including the body to a second cache memory region based on the determination.

The control block may include an offset calculator, a determination unit, and a controller. The offset calculator calculates an offset based on a logical block address value and a super page value. The determination unit determines whether the data to be received includes a body based on calculated offset and a ratio of a sector count value to the super page value. The controller receives the data, and transmits the received data excluding the body to the first cache memory region designated by a first pointer or transmits the received data including the body to the second cache memory region designated by a second pointer based on a determination result output from the determination unit that indicates whether the data to be received includes the body.

An exemplary embodiment of the present invention includes a system, including a cache memory device, a non-volatile memory device, and a plurality of channels connected between the cache memory device and the non-volatile memory device. The cache memory device includes a memory including a first cache memory region and a second cache memory region, and a control block.

The control block determines a type of data to be received and controls at least one of transmitting a head of the received data to the first cache memory region, transmitting a body of the received data to the second cache memory region, or transmitting a tail of the received data to the first cache memory region based on the type of the received data. The control block transmits the body stored in the second cache memory device to the non-volatile memory device through at least one of the plurality of channels.

An exemplary embodiment of the present invention includes a system, including a cache memory device, a non-volatile memory device, and a plurality of channels connected between the cache memory device and the non-volatile memory device. The cache memory device includes a memory including a first cache memory region and a second cache memory region, and a control block.

The control block determines whether data to be received includes a body, and transmits received data excluding the body to a first cache memory region or transmits the received data including the body to a second cache memory region based on a result of the determining. The control block transmits the data including the body stored in the second cache memory device to the non-volatile memory device through at least one of the plurality of channels.

BRIEF DESCRIPTION OF DRAWINGS

The present invention will become more apparent when describing in detail exemplary embodiments thereof, when taken in conjunction with the accompanying drawings of which:

FIG. 3 is a schematic diagram that is used to explain a data classifying method according to an exemplary embodiment of the present invention;

FIG. 9 is a flowchart showing a data processing method of a cache memory device according to an exemplary embodiment of the present invention.

DETAILED DESCRIPTION OF EXEMPLARY EMBODIMENTS

Figure 1:
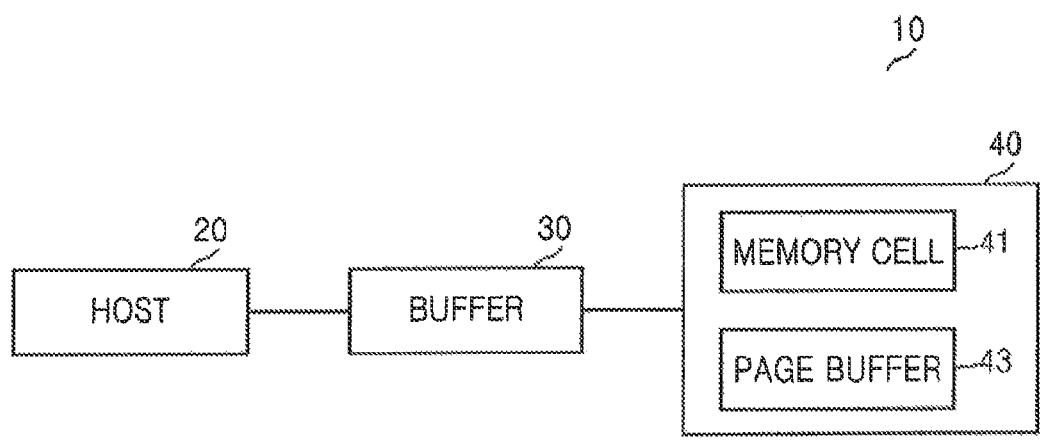
FIG. 1 is a block diagram of a conventional non-volatile memory system that includes a buffer.

The present invention will now be described more fully hereinafter with reference to the accompanying drawings, in which exemplary embodiments of the present invention are shown. Like reference numerals refer to the like elements throughout.

Figure 2:
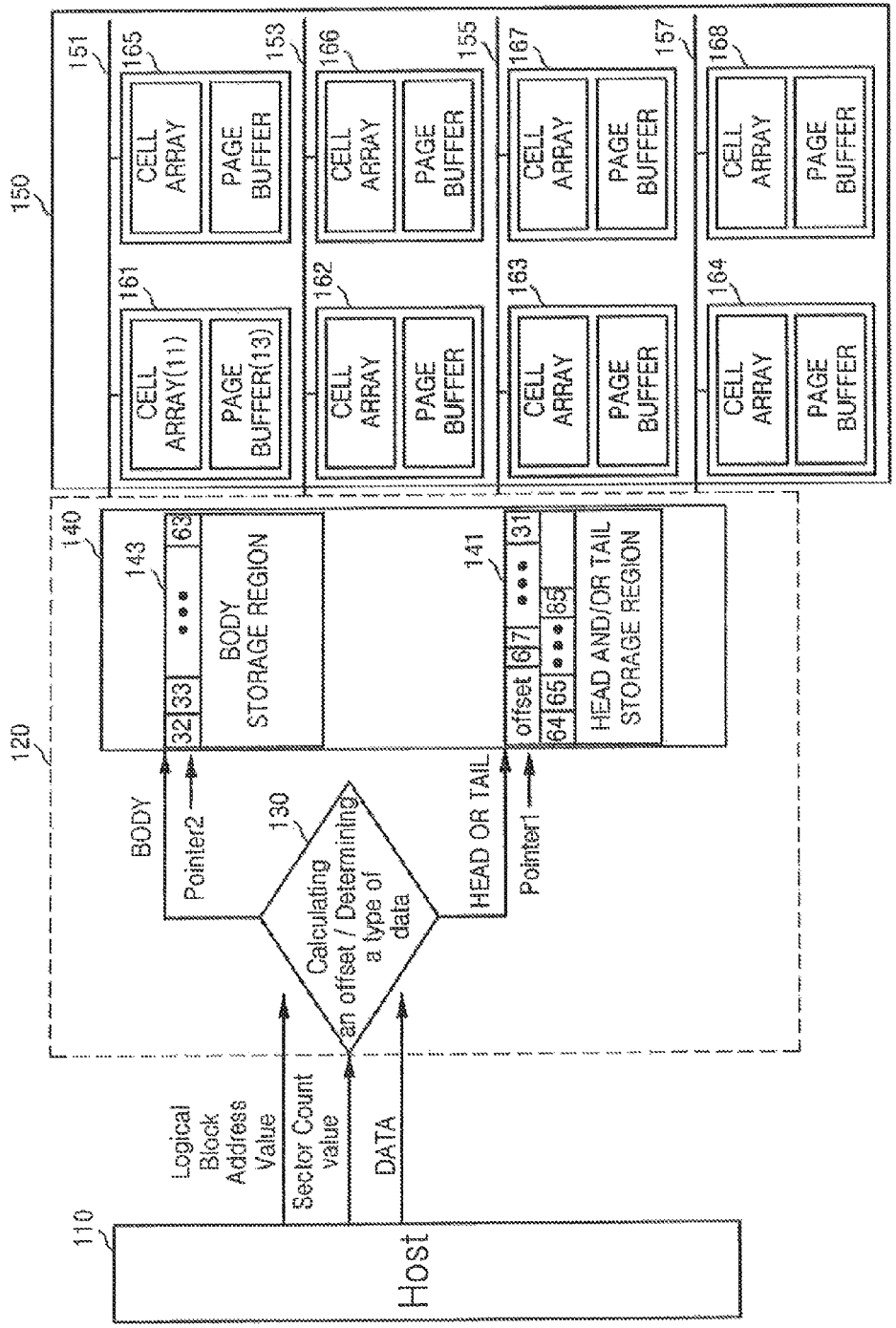
FIG. 2 is a block diagram of a non-volatile memory system including a cache memory device according to an exemplary embodiment of the present invention.

FIG. 2 is a block diagram of a non-volatile memory system including a cache memory device according to an exemplary embodiment of the present invention. Referring to FIG. 2, the non-volatile memory system 100 includes a host 110, a cache memory device 120, and a non-volatile memory device 150. The non-volatile memory system 100 may be, for example, a computer system, an audio system, home automation, or a mobile electronic device.

The host 110 and the cache memory device 120 may exchange data by using a SATA protocol. A SATA oriented SSD includes the cache memory device 120 and the non-volatile memory device 150. The host 110 exchanges data with the non-volatile memory device 150 through the cache memory device 120. The host 110 outputs a logical block address (LBA) value and a sector count value to the memory device 120, and outputs write data DATA to the cache memory device 120.

The cache memory device 120 temporarily stores data transmitted between the host 110 and non-volatile memory devices 161 to 168. The cache memory device 120 includes a control block 130 and a memory 140. The control block 130 receives an LBA value and a sector count value, calculates an offset based on the received LBA value and a super page value, calculates a ratio of the received sector count value to the super page value, and determines a type (or the configuration) of data, which will be received, based on the calculated offset and the calculated ratio.

The types of data may be divided into seven different types. For example, the data types may include: (1) data including only a head, (2) data including only a body, (3) data including only a tail, (4) data including a head and a body, (5) data including a head and a tail, (6) data including a body and a tail, and (7) data including a head, a body, and a tail.

The control block 130 can receive data DATA after determining the type of data to be received. Based on the calculated offset and the calculated ratio, the control block 130 transmits a head included in the received data DATA to a first cache memory region 141 designated by a first pointer Pointer1, transmits a body included in the received data DATA to a second cache memory region 143 designated by a second pointer Pointer2, or transmits a tail included in the received data DATA to a first cache memory region 141 designated by a first pointer Pointer1.

The memory 140 may be embodied as a volatile memory such as an SDRAM or a double data rate (DDR) SDRAM. The memory 140 includes a first cache memory region 141 storing at least one of a head and a tail, and a second cache memory region 143 storing at least a body. There are n channels 151, 153, 155, and 157 between the cache memory device 120 and the non-volatile memory device 150, where n is a natural number (e.g., n may equal 4). The cache memory device 120 and the non-volatile memory device 150 exchange data through at least one channel among the n channels 151, 153, 155, and 157.

A plurality of non-volatile memories 161 and 165, 162 and 166, 163 and 167, and 164 and 168 are connected to each of the n channels 151, 153, 155, and 157. The plurality of the non-volatile memories 161 and 165, 162 and 166, 163 and 167, and 164 and 168 respectively include a cell array 11 and a page buffer 13.

The memory cell array 11 includes a plurality of EEPROMs, and the plurality of EEPROMs may respectively be embodied as a Single Level Cell (SLC) or a Multi Level Cell (MLC).

The page buffer 13 may store m-sectors, where m is a natural number (e.g., m=8). For example, a sector may be k bytes, where k is a natural number (e.g., k=512 or 1024). The memory cell array 11 and the cache memory device 120 exchange data through a channel corresponding to a page buffer 13. The first cache memory region 141 or the second cache memory region 143 include a plurality of unit memory regions, and the plurality of unit memory regions respectively have a super page size.

For example, a super page size (=n*m) may be determined by multiplying the number of channels (e.g., n=4), connected between the cache memory device 120 and the non-volatile memory device 150, by the number of sectors (e.g., m=8), which may be stored in a page buffer 13 of one of the non-volatile memories 161-168. A super page size according to an exemplary embodiment of the present invention is 32-sectors. With respect to a super page size of 32-sectors, "32" is denoted as a super page size value. A super page size may be the same as a body size.

Figure 3:
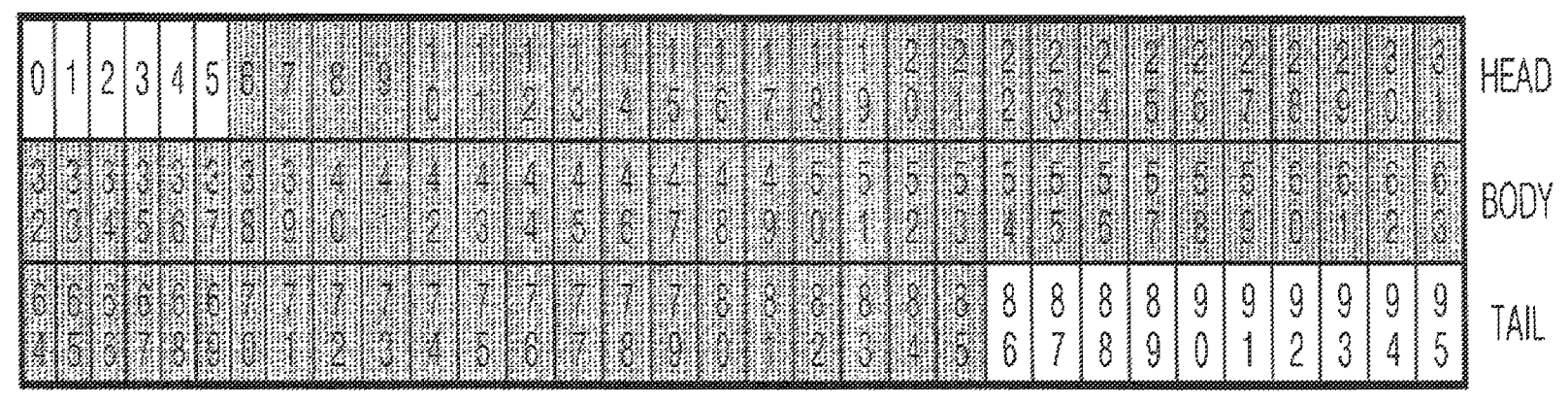
Figure 4:
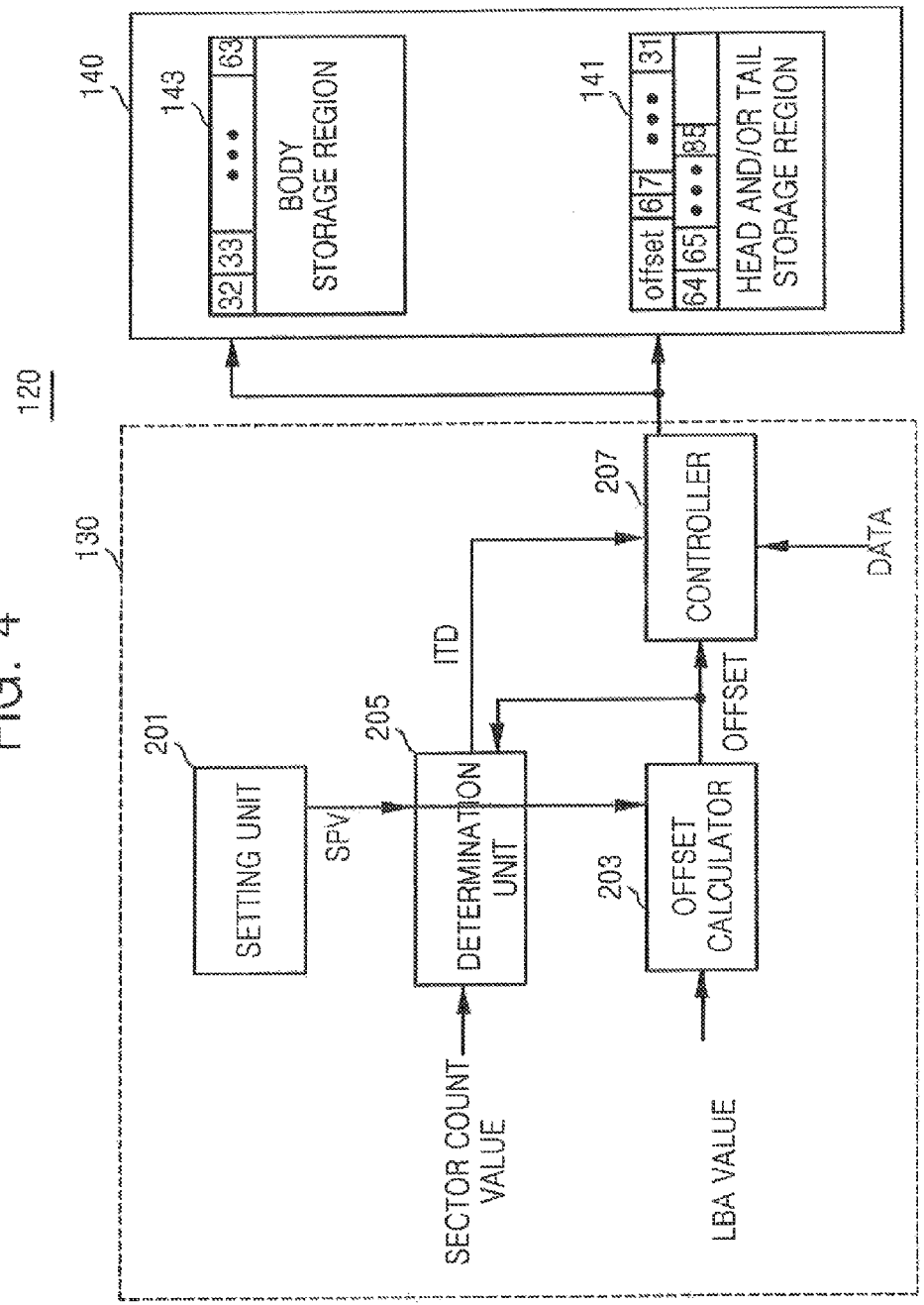
FIG. 4 is a block diagram of a cache memory device including a control block illustrated in FIG. 2.
Figure 5:
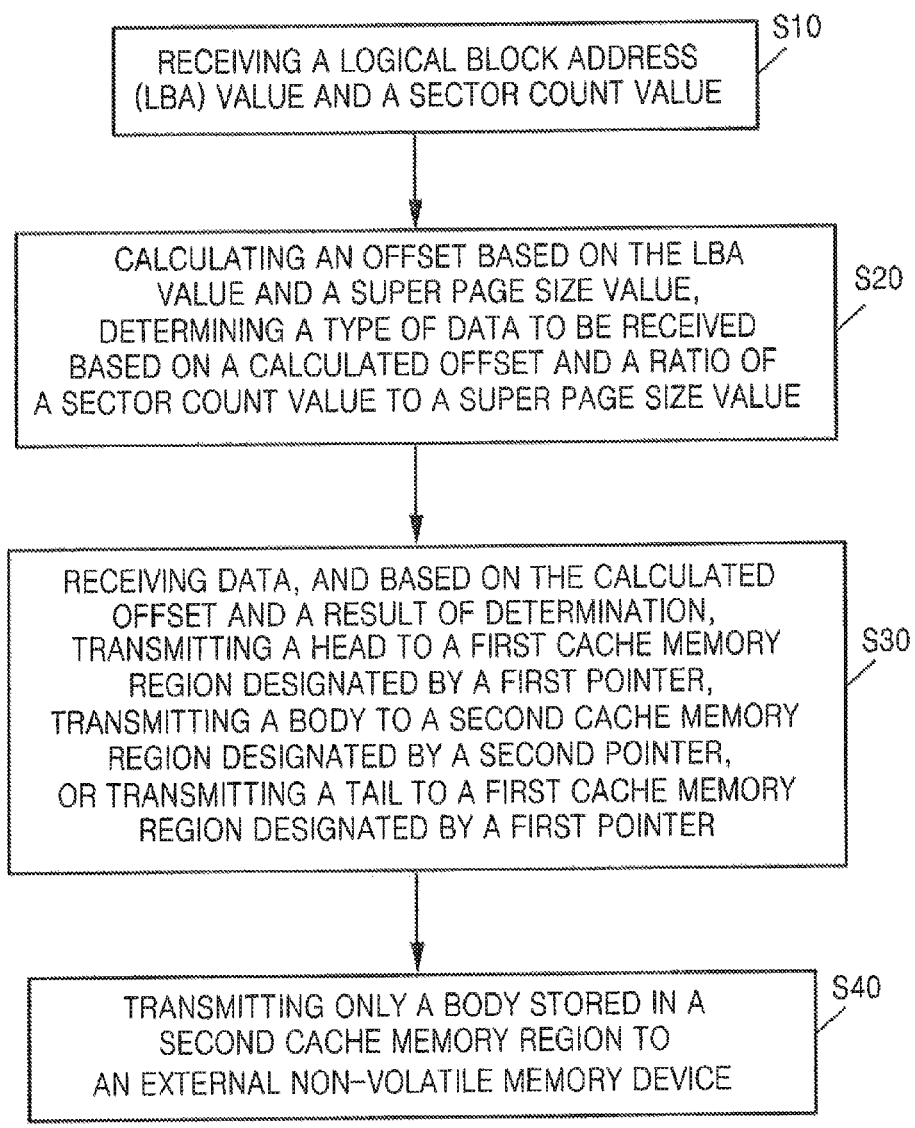
FIG. 5 is a flowchart showing a data processing method of the cache memory device according to an exemplary embodiment of the present invention.

FIG. 3 is a schematic diagram that is used to explain a method of classifying data according to an exemplary embodiment of the present invention. FIG. 4 is a block diagram of a cache memory device 120 including a control block 130 illustrated in FIG. 2, and FIG. 5 is a flowchart showing a data processing method of a cache memory device according to an exemplary embodiment of the present invention. The data processing method of the cache memory device 120 will be described with reference to FIGS. 2, 3, 4, and 5.

The control block 130 includes a setting unit 201, an offset calculator 203, a determination unit 205, and a controller 207. The offset calculator 203 and the determination unit 205 receive a super page size value (e.g., SPV=32) output from the setting unit 201. The setting unit 201 may be embodied as a data storage device as a register, and a super page size value (e.g., SPV=32) may be set through hardware or software.

The cache memory device 120 receives an LBA value (e.g., "6") and a sector count value (e.g., "80") output from the host 110 (S10 of FIG. 5). The offset calculator 203 of the control block 130 calculates a remainder (e.g., 6), that is, an offset by dividing the received LBA value (e.g., 6) by a super page size value (e.g., SPV=32) (S20 of FIG. 5).

The determination unit 205 of the control block 130 calculates a ratio of the received sector count value (e.g., 80) to a super page size value (e.g., SPV=32), and determines a type of data DATA to be received based on the offset calculated by the offset calculator 203 and the calculated ratio (S20 of FIG. 5). The offset calculator 203 and the determination unit 205 may include a determination block.

For example, when a LBA value is 6 and a sector count value is 80, the determination unit 205 may determine, based on an offset (e.g., 6) calculated by an offset calculator 203 and a calculated ratio, whether data to be received includes a head, a body, and a tail.

Each figure illustrated in FIG. 3 corresponds to a memory storage region where each sector can be stored. To define a head, a body, and a tail, a first cache memory region for storing at least one of a head and a tail need not be separated from a second cache memory region for storing a body in FIG. 3, which is different from FIGS. 2 and 4.

When an LBA value is 6 and a sector count value is 80, an offset calculated by an offset calculator 203 is 6. Data corresponding to a sector count value "80" (i.e., data including 80 sectors) may then be sequentially stored by sector in regions marked by a figure of "6" to "85". For example, sectors stored in regions marked by a figure of "6" to "31" may be defined as head (HEAD), sectors stored in regions marked by a figure of "32" to "63" may be defined as body (BODY), and sectors stored in regions marked by a figure of "64" to "85" may be defined as tail (TAIL).

In an exemplary embodiment of the present invention, at least one of a head and a tail is stored in a first cache memory region 141 designated by a first pointer Pointer1, and at least one body is stored in a second cache memory region 143 designated by a second pointer Pointer2.

In another exemplary embodiment of the present invention, when a received LBA value is 0 and a received sector count value is 64, the determination unit 205, based on an offset (e.g., 0) calculated by the offset calculator 203 and a calculated ratio, may determine that the data to be received only includes two bodies.

In another exemplary embodiment of the present invention, when a received LBA value is 38 and a received sector count value is 2, the determination unit 205 may determine that the data to be received only includes a head based on an offset (e.g., 6) calculated by the offset calculator 203 and a calculated ratio. In a further exemplary embodiment of the present invention, when a received LBA value is 32 and a received sector count value is 8, the determination unit 205 may determine that the data to be received only includes a tail based on an offset (e.g., 0) calculated by the offset calculator 203 and a calculated ratio For example, a head refers to data having an offset and received data having a data size smaller than a super page size, a body refers to data having received data having a data size that is a multiple of a super page size without an offset, and a tail refers to data having received data having a data size smaller than the super page size without the offset.

While receiving data corresponding to a sector count value, e.g., 80, output from the host 110, the controller 207 transmits a head to a first cache memory region 141 designated by a first pointer Pointer1, transmits a body to a second cache memory region 143 designated by a second pointer Pointer2, and transmits a tail to the first cache memory region 141 designated by a first pointer Pointer1 based on an offset (e.g., 6) calculated by the offset calculator 203 and a determination result ITD of the determination unit 205 (S30 of FIG. 5). The determination result ITD may be based on the offset and a ratio of the received sector count value to a super page size value.

For example, when an offset is present, a head flag is activated before a first sector of a head is input. Accordingly, the controller 207 stores a first sector of the head DATA input in a region marked by a figure of "6" of a first cache memory region 141 designated by a first pointer Pointer1 based on the activated head flag and an offset output from an offset calculator 203.

While a first sector of the head is stored in a region marked by a figure of "6" of a first cache memory region 141, the head flag is deactivated and a body flag is activated. While a last sector of the head is stored in a region marked by a figure of "31" of the first cache memory region 141, the controller 207 determines that a sector to be input next is a first sector of a body in response to the activated body flag.

Before the last sector of the head is completely stored and a first sector of the body is input, the controller 207 changes a first pointer Pointer1 to a second pointer Pointer2 in response to the activated body flag. Accordingly, a first sector to a last sector of the body may be sequentially stored in regions marked by a figure of "32" to "63" of the second cache memory region 143 designated by the second pointer Pointer2. While the first sector of the body is stored in a region marked by a figure of "32" of the second cache memory region 143, the body flag is deactivated and a tail flag is activated. While the last sector of the body is stored in a region marked by a figure of "63" of the second cache memory region 143, the controller 207 determines that a sector to be input next is a first sector of a tail in response to the activated tail flag.

Before the last sector of the body is completely stored and a first sector of the tail is input, the controller 207 changes a second pointer Pointer2 to a first pointer Pointer1 in response to the activated tail flag.

Accordingly, a first sector to a last sector of the tail may be sequentially stored in regions marked by a figure of "64" to "85" of the second cache memory region 143 designated by the second pointer Pointer2. For example, a determination result ITD of the determination unit 205 may include a head flag, a body flag, and a tail flag. The controller 207 may also generate a head flag, a body flag, and a tail flag based on the determination result ITD of the determination unit 205. In this event, the controller 207 may include a storage device such as a register storing a head flag, a body flag, and a tail flag.

After the first sector to the last sector of the body are completely stored in the second cache memory region 143, the controller 207 may transmit a body (e.g., 32 sectors) stored in the second cache memory region 143 to a non-volatile memory device 150 (S40 of FIG. 5). The controller block 130 may control a timing to transmit the body (e.g., 32 sectors) stored in the second cache memory region 143 to the non-volatile memory device 150.

For example, the control block 130 may divide the body (e.g., 32 sectors), which is stored in the second cache memory region 143, by the number of channels (e.g., 4), and transmit every divided 8-sector to each memory 161, 162, 163, and 164 through each of a plurality of channels 151, 153, 155, and 157.

Figure 6:
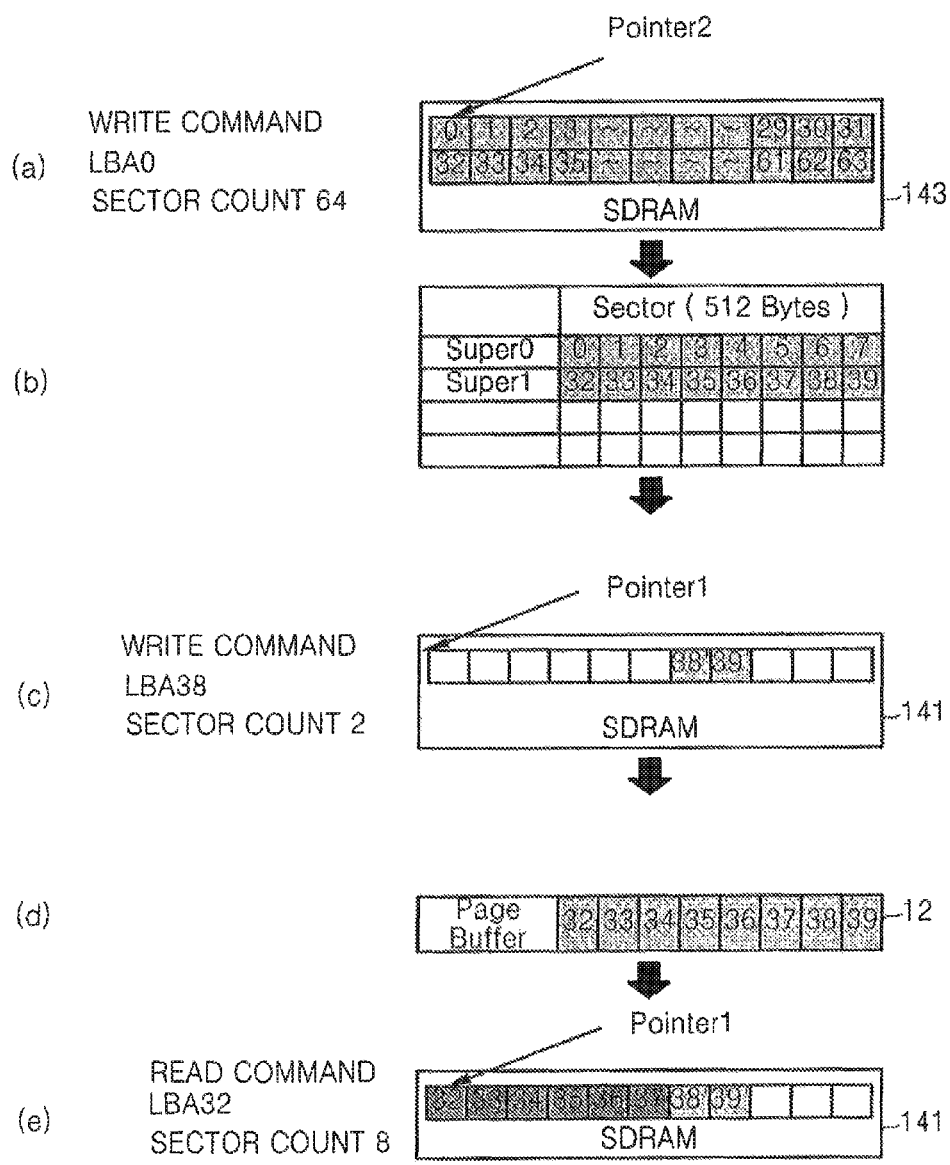
FIG. 6 is a flowchart that is used to explain an operation of writing and reading data on a non-volatile memory device by using the cache memory device illustrated in FIG. 2.

FIG. 6 shows a flowchart that may be used to explain an operation of writing and reading data to/from a non-volatile memory device using the cache memory device illustrated in FIG. 2. When a host 110 outputs a write command, a LBA value "0", and a sector count value "64", outputs a read command, a LBA value "38", and outputs a sector count value "2", and a read command, a LBA value "32", and a sector count value "8", in order, referring to FIGS. 2, 4, and 6, the operation of a cache memory device 120 according to an exemplary embodiment of the present invention can be explained as follows.

The control block 130 receives a write command, an LBA value "0", and a sector count value "64". The control block 130 calculates an offset (e.g., 0) and determines that data DATA to be received only includes two bodies based on the LBA value "0", the sector count value "64", and the super page size value "32".

The control block 130 stores received data, i.e., two bodies including 64 sectors, in regions from 0 to 63 of a second cache memory region 143 designated by a second Pointer Pointer2 based on an activated body flag (FIG. 6(a)). The control block 130 transmits 16-sectors of the 64 sectors respectively to each channel 151, 153, 155, and 157 (FIG. 6(b)). The amount of sectors transmitted to each channel 151, 153, 155, and 157 is obtained by dividing a whole body size (e.g., 64-sectors) by the number of channels (e.g., 4).

The control block 130 receives a write command, a LBA value "38", and a sector count value "2". The control block 130 calculates an offset (e.g., 6) and determines that data DATA to be received only includes a head based on the LBA value "38", the sector count value"2", and the super page size value "32".

Based on the activated head flag and the offset (e.g., 6), the control block 130 stores a received head, (e.g., two sectors), respectively in a seventh memory region 38' and an eighth memory region 39' of a first cache memory region 141 designated by a first pointer Pointer1 (FIG. 6(c)). Here, sectors stored in the seventh memory region 38' and the eighth memory region 39' of the first cache memory region 141 are not transmitted to a non-volatile memory device 150.

Under control of the control block 130, 8 sectors output from a memory cell array 11 are stored in a page buffer 13 of one of the memories 161-168 (e.g., memory 161) of the non-volatile memory device 150 (FIG. 6(c)).

The control block 130 receives a read command, a LBA value "32", and a sector count value "8". The control block 130 calculates an offset (e.g., 0) and determines that data to be read from the memory 161 of the non-volatile memory device 150 only includes only a tail, based on the LBA value "32", the sector count value "8", and a super page size value "32". The control block 130 may read sectors only stored in regions marked by a figure of "32" to "37" from the page buffer 13 to a first cache memory region 141.

Figure 7:
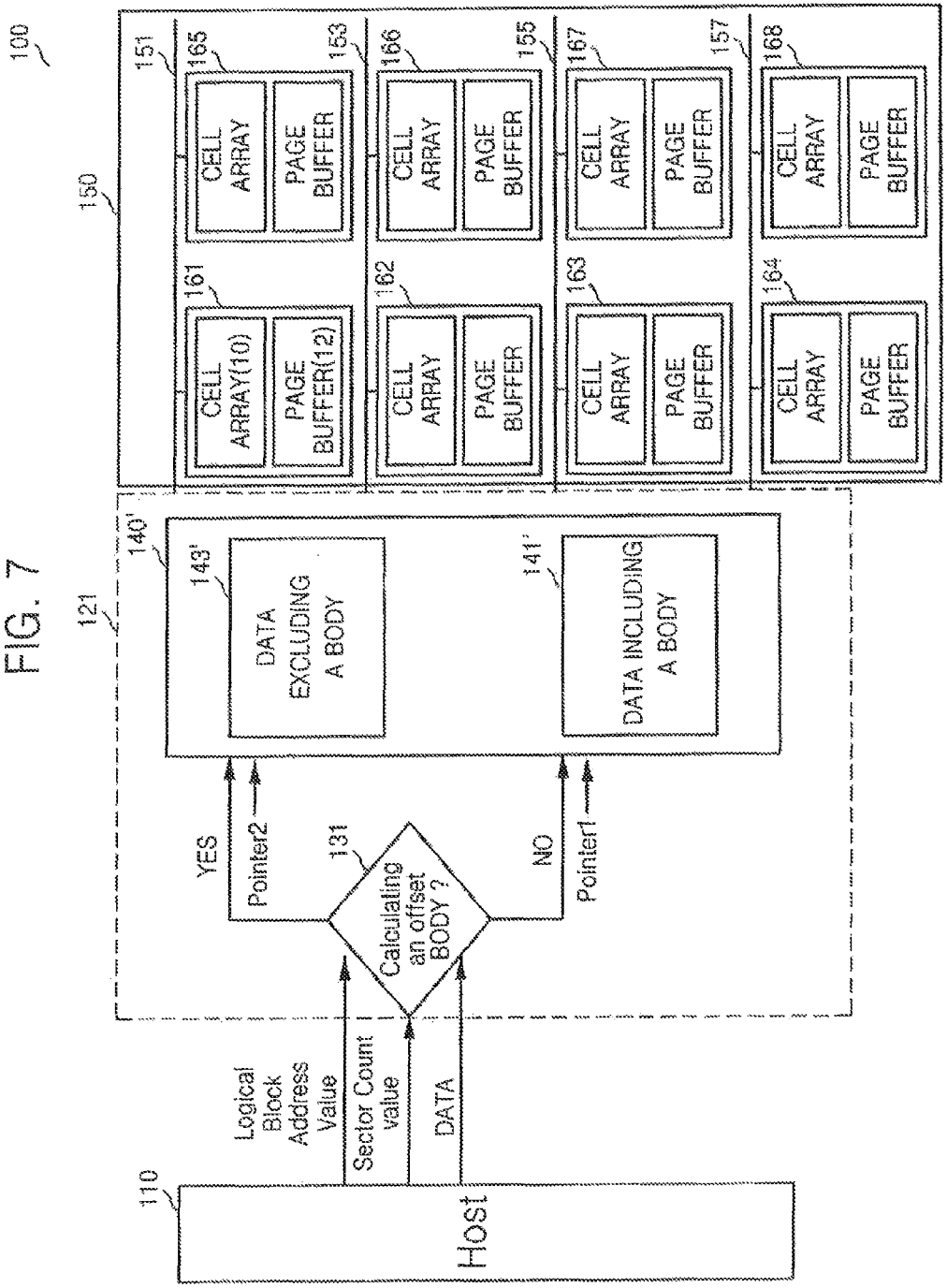
FIG. 7 is a block diagram of a non-volatile memory system including a cache memory device according to an exemplary embodiment of the present invention.
Figure 8:
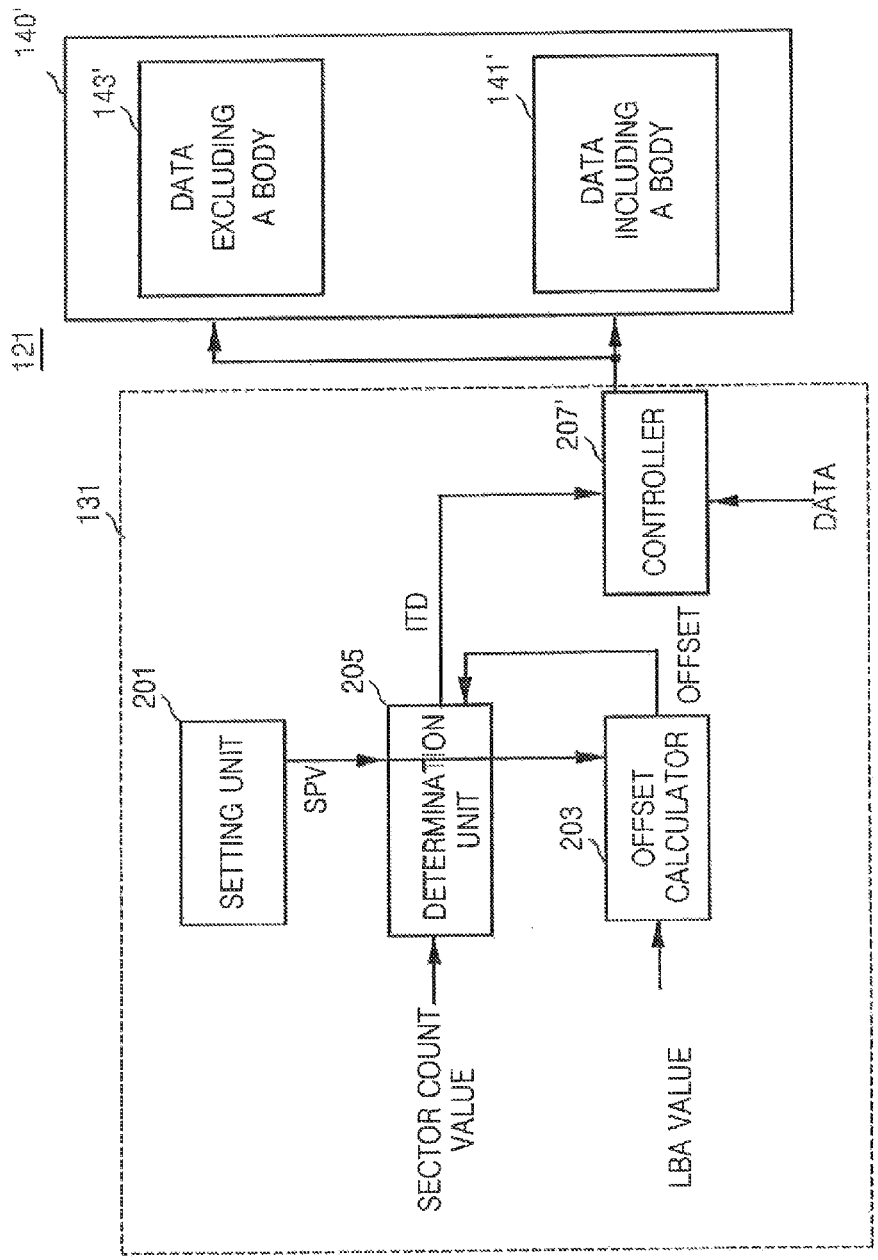
FIG. 8 is a block diagram of the cache memory device including a control block illustrated in FIG. 7.

FIG. 7 is a block diagram of a non-volatile memory system including a cache memory device according to an exemplary embodiment of the present invention. FIG. 8 is a block diagram of a cache memory device including a control block illustrated in FIG. 7, and FIG. 9 is a flowchart showing a data processing method of a cache memory device according to an exemplary embodiment of the present invention.

Referring to FIGS. 7, 8, and 9, a process of a cache memory device 121 to transmit a first data excluding a body to a first cache memory region 141' designated by a first pointer Pointer1 or to transmit a second data including a body to a second cache memory region 143' designated by a second pointer Pointer2 may be explained as follows.

An offset calculator 203 and a determination unit 205 receive a super page size value (SPV=32) output from a setting unit 201. The cache memory device 121 receives a LBA value (e.g., 6) and a sector count value (e.g., 80) output from a host 110 (511 of FIG. 9). The offset calculator 203 calculates the remainder, (or an offset) which comes from dividing the received LBA value (e.g., 6) by the super page size value (SPV=32) (S21 of FIG. 9).

The determination unit 205 calculates a ratio of a received sector count value (e.g., 80) to a super page size value (SPV=32), and determines whether data DATA to be received includes a body based on the offset calculated by the offset calculator and the calculated ratio (S21 of FIG. 9). Data DATA having the offset "6" and the sector count value "80" includes a head, a body, and a tail.

Accordingly, a controller 207' transmits data DATA having the offset "6" and the sector count value "80" to the second cache memory region 143' designated by a second pointer Pointer2 (S31 of FIG. 9). Data stored in the second cache memory region 143' are transmitted to a non-volatile memory device 150 under a control of a control block 131 (S41 of FIG. 9).

However, when the control block 121 receives an LBA value (e.g., 38) and a sector count value (e.g., 2) from the host 110, the control block 121 transmits data having an offset "6" and the sector count value "2" to the first cache memory region 141' designated by a first pointer Pointer1 (S31 of FIG. 9).

A cache memory device according to at least one exemplary embodiment of the present invention includes a storage region for storing a body and another storage region for storing at least a head or a tail, and may improve performance of writing/reading data between a host and a non-volatile memory device by processing a body or data including a body separately.

A cache memory device according to at least one exemplary embodiment of the present invention may improve the performance of writing/reading data between a host and a non-volatile memory device by storing data including a body in a storage region of a memory and transmitting the stored data to a non-volatile memory device.

While the present invention has been shown and described with reference to exemplary embodiments thereof, it will be appreciated by those of ordinary skill in the art that changes may be made in these embodiments without departing from the spirit and scope of the present invention.

What is claimed is:

1. A data processing method of a data storage device including cache memory and a plurality of nonvolatile memory devices coupled to the cache memory through a plurality of channels respectively, the method comprising:
receiving a write command, a logical block address (LBA) value and a sector count value from an external device;
receiving data corresponding to the write command from the external device;
storing the received data into the cache memory, wherein the stored data includes at least one body portion and another portion; and
transferring the at least one body portion from the cache memory to the plurality of nonvolatile memory devices through the plurality of channels,
wherein each channel corresponds to a distinct set of the plurality of nonvolatile memory devices, each set comprising at least one of the plurality of nonvolatile memory devices, and
wherein the body portion is determined to be present in the received data based on an offset and a ratio of the sector count value to a super page size of the data storage device, wherein the offset is based on the LBA value and the super page size.

2. The method of claim 1, wherein the super page size is acquired based on a number of the plurality of channels and a page size included in each of the plurality of nonvolatile memory devices.

3. The method of claim 2, wherein the another portion stored in the cache memory is being maintained in the cache memory while the at least one body portion is being transferred to the plurality of nonvolatile memory devices.

4. The method of claim 2, wherein the page size is a unit of an operation for the write command in each of the plurality of nonvolatile memory devices.

5. The method of claim 2, wherein a size of the at least one body portion is a multiple of a size of the one body portion.

6. The method of claim 1, further comprising dividing the received data into the at least one body portion and the another portion using the LBA value and the sector count value.

7. The method of claim 2, wherein transferring the at least one body portion comprises dividing the at least one body portion stored in the cache memory by a number of channels, and transmitting every divided body portion to each of the plurality of nonvolatile memory devices through each of the channels.

8. The method of claim 2, wherein the another portion includes a head, a size of the head is smaller than a size of the one body portion, and a logical block address of the head is smaller than a logical block address of the one body portion.

9. The method of claim 8, wherein the at least one body portion is stored in a first region of the cache memory and the head is stored in a second region different from the first region in the cache memory.

10. The method of claim 9, wherein data of the head stored in the second region is maintained in the second region while the at least one body portion stored in the first region is transferred to the plurality of the nonvolatile memory devices through the plurality of channels.

11. The method of claim 2, wherein the another portion includes a tail, a size of the tail is smaller than a size of the one body portion, and a logical block address of the tail is greater than a logical block address of the one body portion,
wherein the at least one body portion is stored in a first region of the cache memory and the tail is stored in a second region different from the first region in the cache memory.

12. The method of claim 11, wherein the data of the head or the data of the tail stored in the second region is maintained while the at least one body portion stored in the first region is transferred to the plurality of the nonvolatile memory devices through the plurality of channels.

13. A data storage device
receiving a write command, a logical block address (LBA) value, a sector count value and data for the write command, comprising:
a controller block configured to divide the data into a least one body portion and another portion using an offset and a ratio of the sector count value to a super page size of the data storage device, wherein the offset is based on the LBA value and the super page size;
a cache memory configured to temporarily store the data corresponding to the write command; and
a plurality of nonvolatile memory devices, coupled to the cache memory through a plurality of channels,
wherein the controller block is configured to transmit the at least one body portion stored in the cache memory to the plurality of nonvolatile memory devices through the plurality of channels,
wherein a size of one of the body portions is determined by a number of the plurality of channels and a page size which is a unit for the write operation included in each of the plurality of nonvolatile memory devices, wherein each of the plurality nonvolatile memory devices comprises:

a cell array including a plurality of memory cells; and a page buffer configured to store sectors, wherein the size of the one body portion is further determined by a size of the page buffer which is a unit of an operation for the write command.

14. The data storage device of claim 13, wherein the another portion includes a head, wherein a size of the head is smaller than the size of the one body portion and data of the head is maintained in the cache memory while the at least one body portion is transferred to the plurality of nonvolatile memory devices.

15. The data storage device of claim 13, wherein the another portion includes a tail, wherein a size of the tail is smaller than the size of the one body portion and data of the tail stored in the cache memory is maintained in the cache memory while the at least one body portion is transferred to the plurality of nonvolatile memory devices.

16. A data processing method for a data storage device including a cache memory and a plurality of nonvolatile memory devices coupled to the cache memory through a plurality of channels respectively, the method comprising:

receiving a write command, a logical block address (LBA) value, and a sector count value from an external device;

receiving write data corresponding to the LBA value and the sector count value;

storing the write data into the cache memory, wherein the stored write data includes a head portion and a body portion; and transferring the body portion to the plurality of nonvolatile memory devices while the head portion is maintained in the cache memory, wherein data of the head portion is received earlier than data of the body portion at the cache memory and wherein the body portion is determined to be present in the received data based on an offset and a ratio of the sector count value to a super page size of the data storage device, wherein the offset is based on the LBA value and the super page size.

17. The method of claim 16, wherein the super page size is acquired based on a number of the plurality of channels and a page size included in each of the plurality of nonvolatile memory devices.

18. The method of claim 17, wherein transferring the body portion comprises dividing the body portion stored in the cache memory by a number of channels, and transmitting every divided body portion to each of the plurality of nonvolatile memory devices through each of the channels.

19. The method of claim 16, wherein the head portion includes a head, a size of the head is smaller than a size of the body portion, and a logical block address of the head is smaller than a logical block address of the body portion.

20. The method of claim 19, wherein the body portion is stored in a first region of the cache memory and the head is stored in a second region different from the first region in the cache memory.

\* \* \* \* \*